Dec. 29, 1953     W. D. HERRICK     2,664,332
GUARD FOR INDUSTRIAL MACHINES
Filed July 28, 1951     6 Sheets-Sheet 1

INVENTOR.
BY WALLACE D. HERRICK
ATTORNEYS

Patented Dec. 29, 1953

2,664,332

UNITED STATES PATENT OFFICE 2,664,332

GUARD FOR INDUSTRIAL MACHINES

Wallace D. Herrick, Dayton, Ohio

Application July 28, 1951, Serial No. 239,159

10 Claims. (Cl. 312—210)

This invention relates to apparatus for shielding industrial machinery for purposes such as the protection of both the machinery and its operating personnel, improved appearance, improved cleanliness and the like.

The invention has special application to the shielding of production equipment such, for example as machinery for filling collapsible containers, food packaging machinery, supply and packing tables, and like industrial machinery installations where cleanliness and protection of personnel, equipment and products may be of importance. Thus the invention is especially useful in conjunction with equipment operated by women and involving operations wherein a clean and attractive appearance are important both for efficiency and also for purposes of sanitation and personnel morale. The invention accordingly has a major object the provision of shielding apparatus for machinery of the type exemplified above which will form an effective shield between the operating personnel and the sides of the machinery for the protection of both, which is free standing with respect to the machinery and is therefore readily assembled independently of the machinery, which includes easily removable sections for ready access to the machinery for servicing and the like as required, and which is formed with smoothly rounded contours minimizing projections and sharp edges while at the same time imparting a smoothly finished appearance to the complete installation.

In accordance with the invention, the shielding apparatus has a free standing main frame composed of legs and connecting structure including a railing which extends around the upper end of the frame in outwardly spaced relation with the machinery or other equipment enclosed thereby. This frame forms the support for a plurality of panels providing the sides of the shielding apparatus, and the panels and frame include cooperating portions forming a readily removable mounting for the panels providing for individual removal thereof as required for access to the machinery. Decking panels are also provided for enclosing the upper portion of the space between the railing and the machinery, and these decking panels are also removably mounted on the frame for ready access to the machinery.

In order to provide increased foot room for the operators, and also to impart a smoothly streamlined appearance to the installation, the legs of the frame are formed to extend upwardly and outwardly in such manner as to support the side panels in outwardly inclined position. Since the side panels are formed with parallel side edges, this arrangement provides diverging spacing between the side edges of adjacent panels at each corner of the frame, with the direction in which this spacing diverges depending upon whether an inside or outside corner is involved. A smoothly finished interconnection is provided between these side edge portions of the corner panels by means of a special construction of the corner legs in that each is formed with a smoothly curved and tapering outer surface portion, which is convex for an outside corner and concave for an inside corner, and which thus smoothly fills in the spaces which would otherwise exist between adjacent edges of the panels at each corner of the frame.

As noted, the apparatus of the invention is especially useful in conjunction with equipment commonly operated by women, and provision is made for convenient disposal of the handbags and like personal property of the operators within the shielding apparatus. For this purpose, certain of the side panels are formed with openings therethrough, and drawer-like containers are mounted in these openings to form receptacles for the personal property of the operators, with these containers being mounted on the panels in such manner that when closed, their front walls are substantially flush with the surrounding outer surfaces of the panels to provide the desired smoothly finished appearance. It will be readily apparent that these containers may also be used to store maintenance equipment for the machinery and the like.

It is accordingly among the objects of the invention to provide shielding apparatus for industrial machinery and the like having one or more of the above characteristics, and other objects and advantages of the invention will be apparent from the following description, the accompanying drawings and the appended claims.

Figure 1:
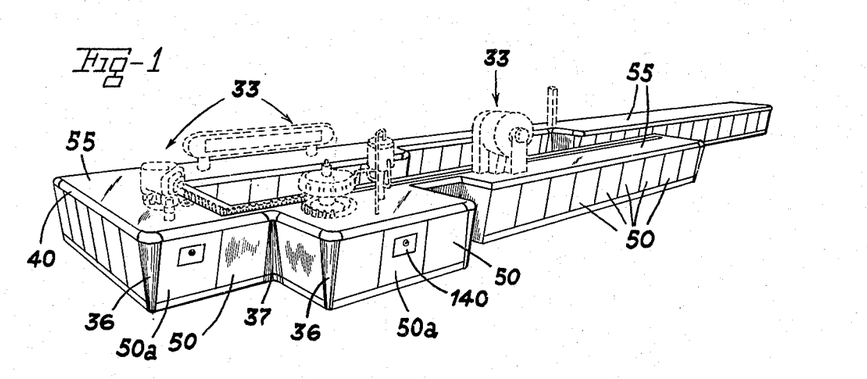
Figs. 1, 2 and 3 are perspective views illustrating typical installations of the shielding apparatus of the invention.
Figures 2, 3:
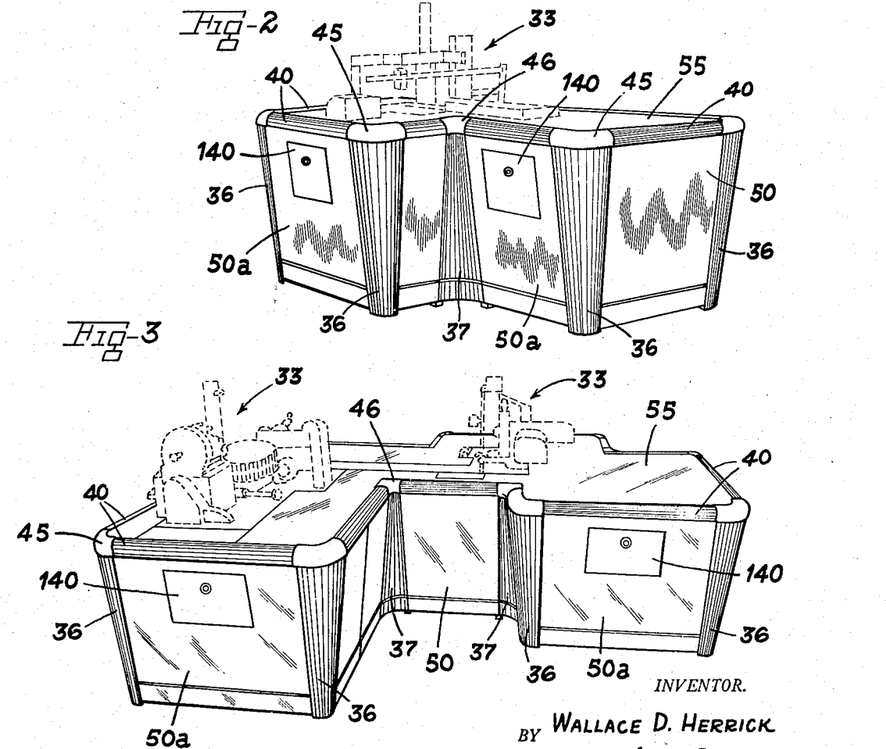
Figure 4:
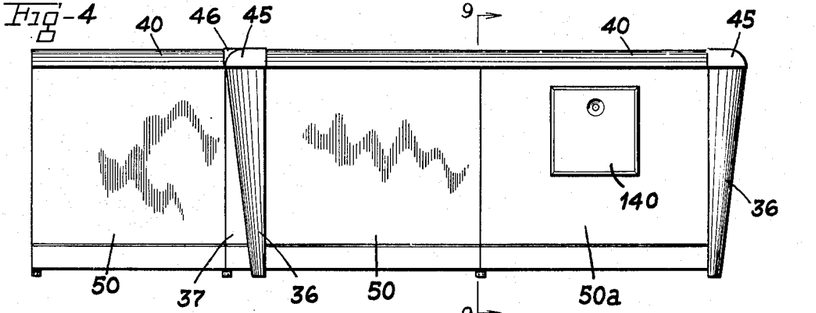
Fig. 4 is a front elevational view of an installation in accordance with the invention.
Figure 5:
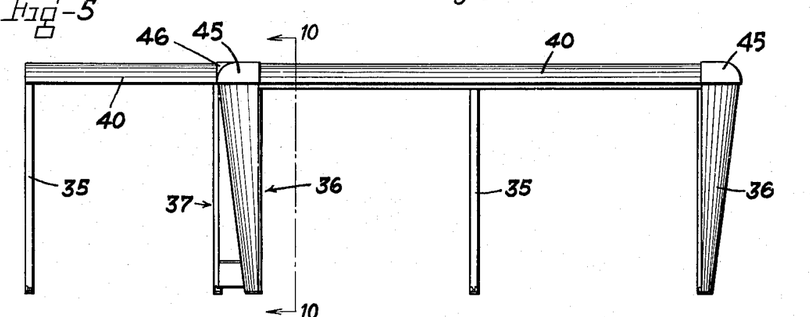
Fig. 5 is a view of the main frame for the installation of Fig. 4 with the side panels removed.
Figures 6, 7:
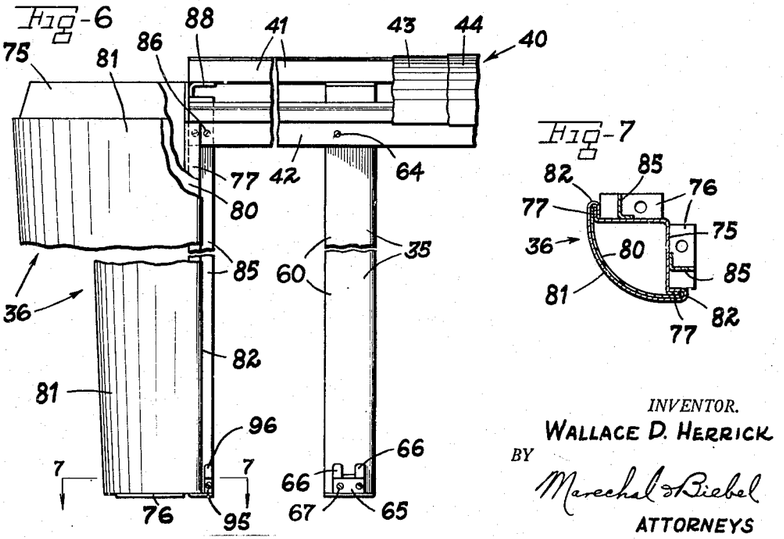
Fig. 6 is an enlarged fragmentary view showing side and outside corner legs of the main frame for the apparatus together with parts of the connecting structure.
Fig. 7 is a section on the line 7—7 of Fig. 6 through the lower end of an outside corner leg.
Figure 8:
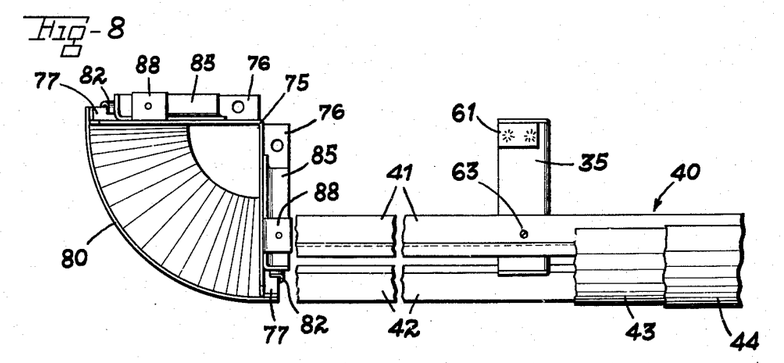
Fig. 8 is a top view of the leg structure of Fig. 6.
Figure 26:
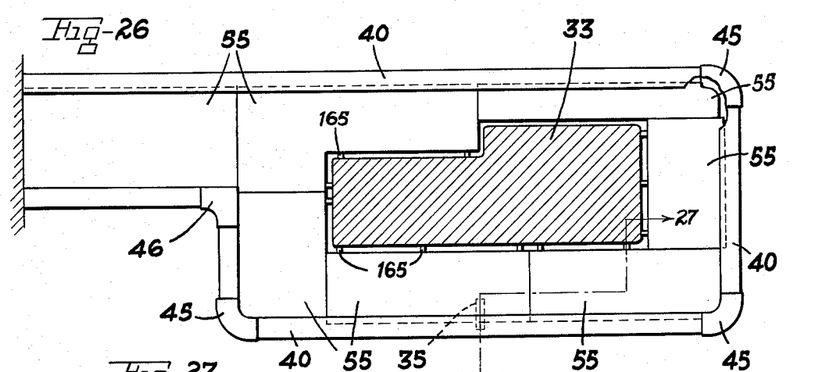
Fig. 26 is a plan view of the installation shown in Fig. 4.

Referring to the drawings, which illustrate preferred embodiments of the invention, Figs. 1 to 3 show typical installations of apparatus in accordance with the invention for shielding industrial machinery indicated diagrammatically in dotted lines at 33. Figs. 4, 5 and 26 similarly illustrate a typical installation of the shielding apparatus of the invention, in which the main component parts are the side legs 35, the outside corner legs 36, the inside corner legs 37, and the railing 40 which forms the connecting structure between the legs. This railing 40 includes Z-bars 41 extending across the tops of the legs, channels 42 extending across the front of the legs, and curved nosing composed of an inner reinforcing member 43 and an outer sheath 44 which may be of stainless steel or other decorative material, and the connections between the nosing at each corner of the apparatus are formed by corner caps 45 on the outside corner legs and corner cap 46 on the inside corner legs.

The legs 35—37 are each formed at their lower ends for direct bolting to the floor as indicated at 47, and the legs and railing thus cooperate to form a complete frame which is free standing independently of the machinery or other equipment 33 with which it is used. This frame in turn supports a plurality of side panels 50 which are mounted for quick and easy individual removal and replacement to provide ready access to the machinery. The frame also supports a plurality of decking panels 55 for enclosing from above the space between the railing and the machine, the decking panels being similarly removable for access to the machine and being shown as formed of wood base panels provided with a surface layer 56 for Formica or other plastic material.

Each side leg 35 is formed of heavy sheet metal folded to provide a pan-like structure and including a front wall 60 which is formed by a flange portion of the leg and is inclined upwardly and outwardly to support the railing in outwardly spaced relation with the lower ends of the legs and thus to provide increased foot room for the operators standing in close relation with the railing. Each side leg has welded connections between its folded over portions and is also provided with welded reinforcing brackets 61 and 62 (Fig. 9) at its upper end portions for increased rigidity. The Z-bars 41 extend across the upper ends of the side legs 35 and are secured thereto as by bolts and nuts 63, and the channels 42 are similarly secured to the front wall of each side leg as by bolts and nuts 64. At the lower end of each side leg is a bracket 65 having a pair of upwardly projecting lug portions 66 which form supporting and locking members for the side panels 50 as described hereinafter, the brackets 65 being secured to each side leg as by bolts and nuts 67.

The panels 50 have parallel side edges, and they are supported in parallel relation with the inclined forward front walls 60 of the side legs 35, as shown in Figs. 1-3 and 9. As a result, there is diverging spacing between the adjacent side edges of the panels at each corner of the frame, with this spacing diverging from bottom to top at the outside corners and from top to bottom at the inside corners of the frame. A special construction is accordingly provided for the corner legs which includes curved and tapered outer surface portions forming a smooth interconnection between adjacent side panels at each corner of the shielding apparatus, with this curved surface portion being convex on each outside corner leg and concave on each inside corner leg.

The construction of each of the outside corner legs 36 is shown in detail in Figs. 6-8 and 10-12. The main structural member of the leg is a folded sheet metal member 75 having flanged portions 76 at its lower end for bolting to the floor, and the side edges of the member 75 include laterally extending flanges 77 which are inclined upwardly and outwardly at substantially the same angle as the front wall 60 of each side leg. A curved front section 80 is welded to the flanges 77, and this part 80 is formed as a section of a cone to provide a convex outer face for each leg 36. A sheath 81 of similar configuration is mounted on the front of each leg 36 for improved appearance, the sheath 81 being formed of stainless steel or other decorative material and being shown as mounted on the leg by means of rolled edge portions 82 fitted around the side edges of the part 80 and the flanges 77.

An angle 85 is secured to each side of the leg member 75 with its forward leg extending outwardly and in parallel and inwardly spaced relation with the adjacent flange 77. One end of the channels 42 is secured to each of these angles 85 as by bolts and nuts 86, and angle brackets 88 are secured to the top of each leg member 75 to support the ends of Z-bars 41, which may be connected thereto as by a bolt or nut 89. At the upper end of each outside corner leg is a rounded corner cap 45, which overlaps the adjacent ends of the nosing and is secured thereto by welding as indicated at 90 in Fig. 12. At the lower end of each angle 85 is a bracket 95 similar to the bracket 65 but having only a single lug 96.

The construction of one of the inside corner legs 37 is shown in detail in Figs. 13–16. Each leg 37 includes two leg members 99 each of substantially the same construction as one of the side legs 35 and including an inclined front wall 100. A Z-bar 101 is bolted at 102 to the front wall of each of these leg members 99 and includes an outer flange portion 103 inclined parallel with the front wall 100. A conical section 105 is in turn welded to these flanges 103 and this section 105 is substantially identical with the section 80 of the outside corner legs but is arranged with its smaller end uppermost.

The section 105 is shown as provided at its lower end with a protective sheath or cover 106, which may be of stainless steel or other decorative material having its side edges rolled at 107 around the edges of the section 105 and flanges 103. The bottom of the sheath 106 is similarly rolled around the lower end of section 105, and its upper end is received within a turned over bead strip 108 welded to the front of the section 105. The Z-bars 41 of the railing are shown as bolted at 110 to the upper walls of the leg member 99, and the channels 42 are similarly bolted at 111 to the inclined front walls 101 of the leg members 99. A bracket 95 is bolted at the lower end of the wall 100 of each leg member 99, and at the top of each inside leg is a rounded corner cap 46, which overlaps the adjacent ends of the nosing and is secured thereto as by welding as indicated at 115 in Fig. 16.

Figure 17:
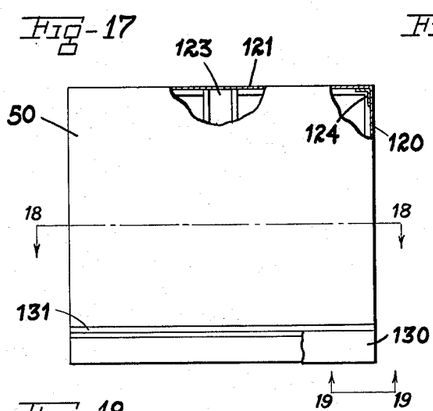
Fig. 17 is a detail view in front elevation, partly broken away, showing one of the side panels.
Figures 18, 19, 20, 22, 23, 24, 25:
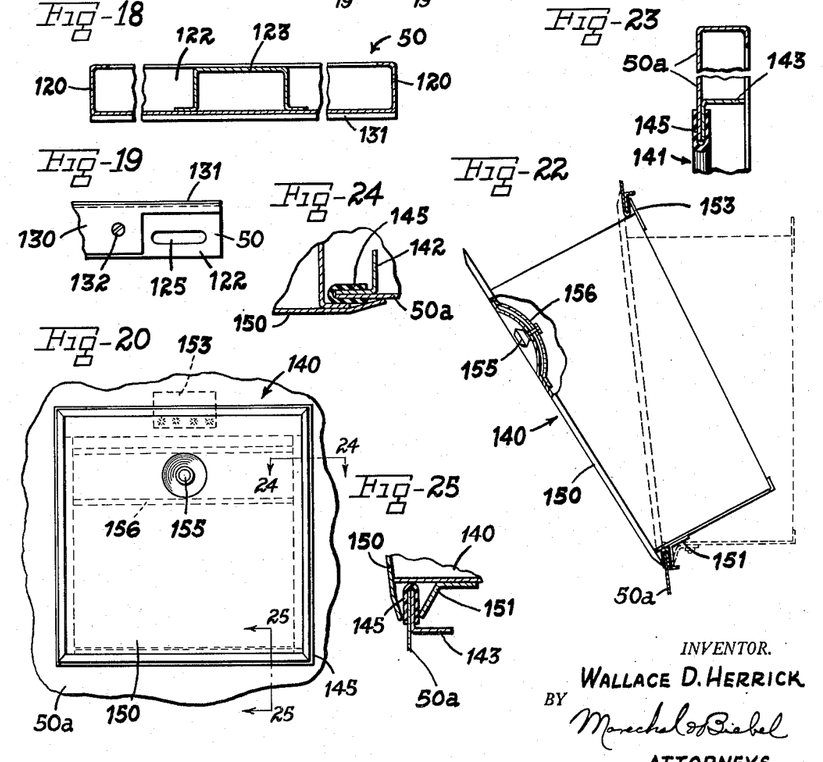
Fig. 18 is a section on the line 18—18 of Fig. 17.
Fig. 19 is a fragmentary bottom view of one corner of the panel of Fig. 17, the view being taken approximately as indicated by the line 19—19 of Fig. 17.
Fig. 20 is a front elevational view showing one of the handbag containers and the surrounding portion of a side panel.
Fig. 22 is a side elevational view, partly broken away in section, illustrating the operation of the handbag container.
Fig. 23 is an enlarged fragmentary section on the line 23—23 of Fig. 21.
Fig. 24 is an enlarged fragmentary section on the line 24—24 of Fig. 20.
Fig. 25 is an enlarged fragmentary section on the line 25—25 of Fig. 20.
Figure 21:
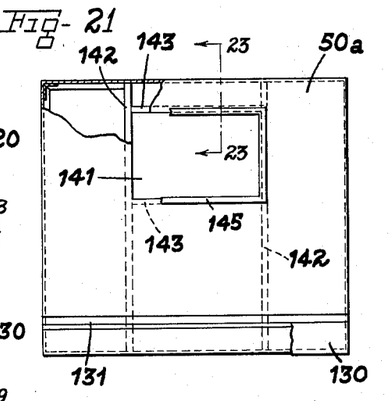
Fig. 21 is a view similar to Fig. 17 showing one of the panels for supporting the handbag container.

Figs. 17–19 show in detail the construction of one of the side panels 50. As shown, this panel is formed primarily of a single piece of sheet metal folded at its ends and sides to provide flange portions 120 at either side, 121 at the top, and 122 at the bottom. A reinforcing channel 123 is welded within the panel, and its corners may be reinforced by means of welded brackets 124. Near each end of the lower end flanges 122 on each panel is a slot 125 for receiving the lugs 66 or 96 on the brackets 65 and 95 respectively.

Figure 9:
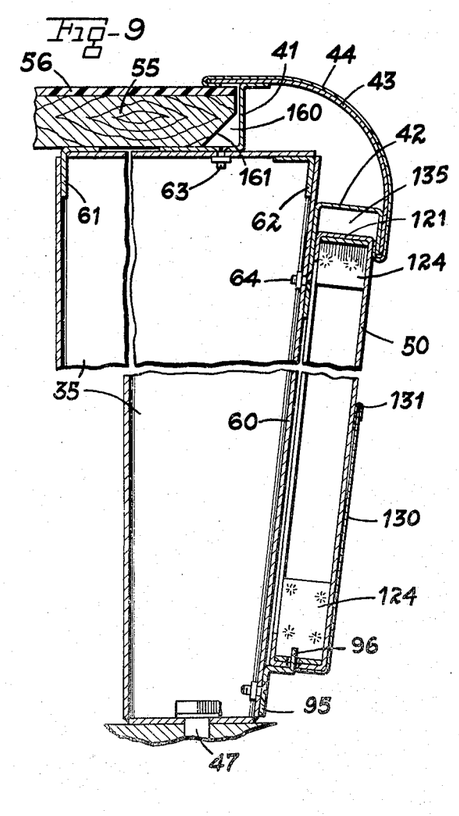
Fig. 9 is an enlarged section on the line 9—9 of Fig. 4.
Figure 10:
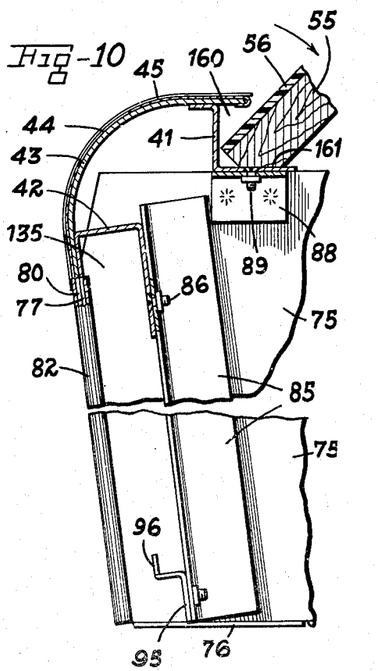
Fig. 10 is an enlarged section on the line 10—10 of Fig. 5.
Figure 11:
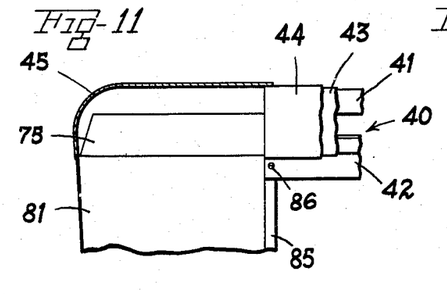
Fig. 11 is a fragmentary view of the top of an outside corner leg and its connecting structure, with the corner cap shown in section.
Figures 12, 15:
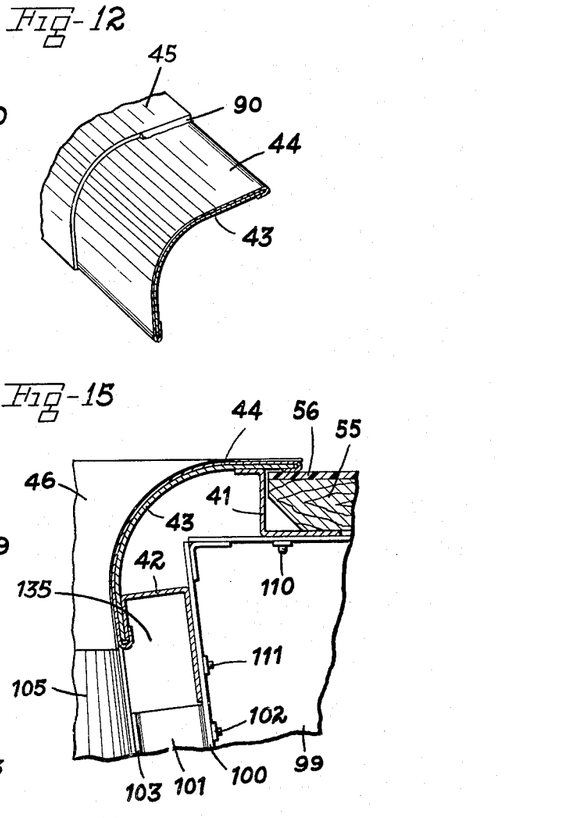
Fig. 12 is a fragmentary perspective view showing the connection between the outside corner cap and the adjacent portion of the nosing.
Fig. 15 is an enlarged fragmentary section on the line 15—15 of Fig. 14 but showing the corner cap and decking in place.
Figure 13:
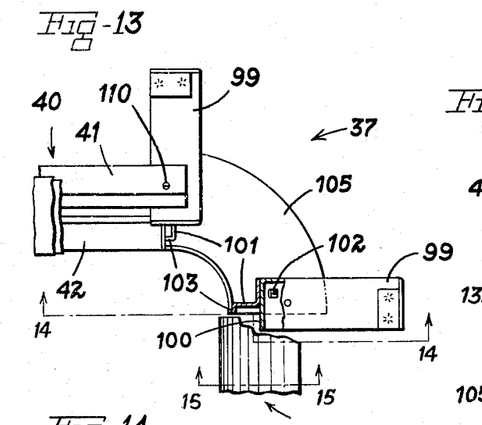
Fig. 13 is a view approximately on the line 13—13 of Fig. 14 showing an inside corner leg with the corner cap and portions of the nosing removed.
Figure 14:
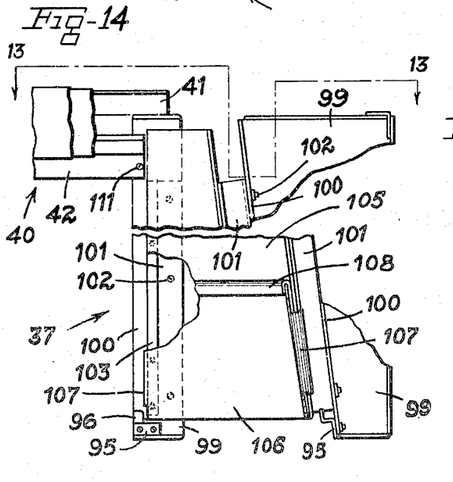
Fig. 14 is a fragmentary view in side elevation, partly broken away, showing the inside corner leg, the view being taken approximately as indicated by line 14—14 of Fig. 13.
Figure 16:
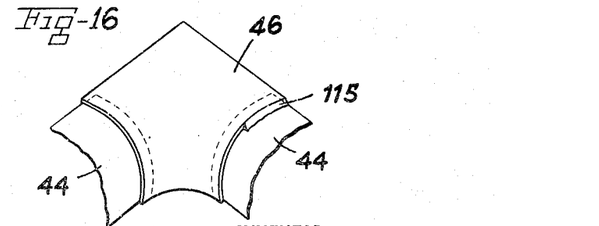
Fig. 16 is a fragmentary perspective showing the inside corner top cap.

Each of the panels 50 is provided along its lower edge with a strip 130 of stainless steel or other decorative material which also serves to protect the panel during mopping or other cleaning up operations around the installation. As best seen in Figs. 9 and 19, the upper end of the mop strip 130 is received within a turned over bead strip 131 welded along the face of the panel, and the lower edge of the mop strip is turned around the lower end of the panel and is secured as by screws 132 to the bottom flange 122. As shown in Figs. 1–3, the mop strip on the panels matches the similar mop sheath 106 on each of the inside corner legs.

The flange portions at the sides and ends of each panel 50 are proportioned for properly fitting engagement with the adjacent portions of the legs and railing of the main frame to provide a smoothly finished assembly. In particular, the depth of the panel between its front face and the rearward face of its top flange 121 is such that the upper end of the panel is readily received in the recess 135 formed along the lower edge of the railing by the channels 42. Similarly the depth of each panel along its side edges is such that when it is fitted against the front wall 60 of a side leg and against the flange 85 or wall 100 of a corner leg, the front surface of the panel will merge smoothly with the outer surface portion of the adjacent corner leg. With this construction, assembly of each panel in place is quickly and easily accomplished by inserting its upper end in the proper recess 135, raising it sufficiently to clear the lugs 66 or 96 on the adjacent legs, and then lowering it into a position of interfitting relation between the recess 125 in its lower end and the lugs 66 or 96. Removal of the panel is accomplished with equal ease by following the reverse sequence of steps, and it will therefore be seen that the panels can be readily removed and replaced as desired.

Certain of the panels have been designated as 50a in the drawings, and they are distinguished from the panels 50 by having mounted therein a container 140 for receiving materials such as the handbags or other personal property of the operators, maintenance equipment, and the like. Referring to Figs. 20–25, each panel 50a is generally similar in construction to the panels 50 except that it is provided with a rectangular opening 141 in the upper part of its central portion, and in place of a reinforcement such as shown at 123 for the panels 50, each panel 50a is reinforced by means of a pair of vertically arranged angles 142, one on each side of the opening 141, and by an additional pair of angles 143 extending across the top and bottom of opening 141. A rubber channel 145 lines the periphery of opening 141 as shown in Figs. 23–25.

The container 140 has the configuration of a short but relatively deep drawer, and its front wall 150 is larger than the opening 141 to form a closure for this opening. Along the bottom and adjacent the front of the container is an angled strip 151 which is welded or otherwise secured thereto, and this strip 151 cooperates with the inwardly turned lower edge of the front wall 150 to form a fulcrum point for the container around the lower edge of the opening 141. A stop strip 153 at the top of the back of the container limits its outward movement as shown in Fig. 22. A handle knob 155 is provided in a recessed portion of the front wall 150, this handle being reinforced by a strip 156 welded inside the front wall.

The panels 50a are otherwise constructed in the same manner as panels 50 for ready assembly or removal with respect to the main frame, and the number of these panels of 50a may therefore be varied in accordance with the number of the containers 140 desired for the particular installation. The containers 140 are mounted in these panels before installation, and in use it is merely necessary to pull the container forward as indicated in full lines in Fig. 22 to its open position. After the container is pushed back into closed position, it is retained therein by gravity.

Figs. 26–29 illustrate different supporting arrangements for the decking panels 55. In the installation shown in Fig. 27, the outer edge of the decking panel 55 is received and wedged within the recess 160 formed between the lower leg of the Z-bar 41 and the inwardly projecting portion of the nosing. These parts are initially so proportioned that the edge of the panel must be wedged therein and is thus firmly but removably retained in place. In order to facilitate this installation, the lower edge portion of the decking panel may be beveled as shown at 161 to form a cam surface operating as illustrated particularly in Fig. 10. As shown, the decking panel is initially inserted into the recess 160 at an angle, and it is then pushed downwardly into the horizontal position in which its outer edge is firmly gripped in the recess 160.

Figure 27:
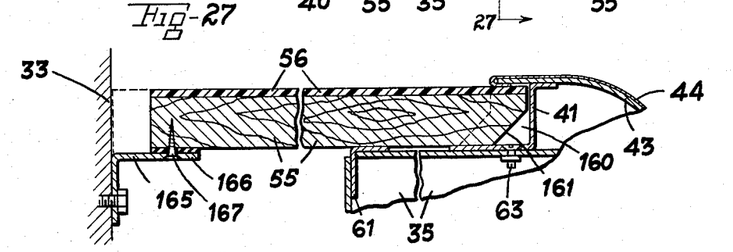
Fig. 27 is an enlarged fragmentary section on the line 27—27 of Fig. 26 showing a supporting arrangement for the decking at the top of the apparatus.
Figure 28:
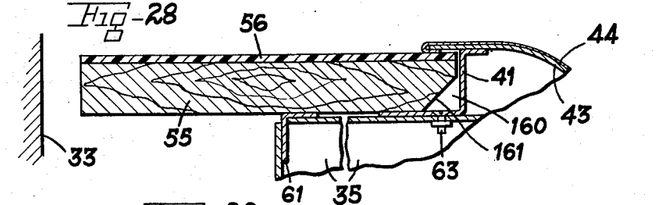
Figs. 28 and 29 are views similar to Fig. 27 showing other arrangements for supporting the decking.

The upper wall of each of the side legs 35 as well as the upper walls of the inside corner legs and the Z-bars 41 all provide support for the decking panels. The inner edge of each decking panel may if desired be further supported by means such as an angle bracket 165 (Fig. 27) mounted on the machinery 33, in which case a cushioning strip 166 and screw 167 may be used at each bracket to minimize vibration. This type of support as shown in Fig. 27 is desirable if the decking panels are of substantial width, but if they are relatively narrow, the Z-bars and the wedging action of the nosing has been found sufficient for the desired support of the decking panels independently of the machinery, as shown in Fig. 28.

Figure 29:
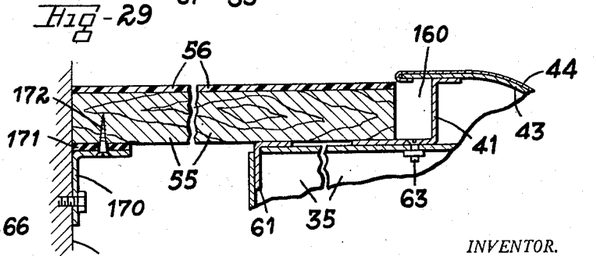
Figure 30:
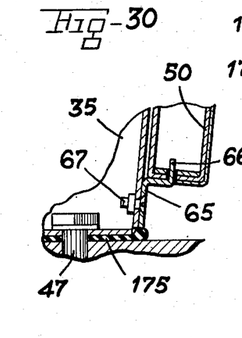
Fig. 30 is an enlarged fragmentary section showing a sealed mounting for a leg.

Figs. 29 and 30 illustrate a type of installation found particularly useful in conjunction with food handling apparatus where close sealing for the purpose of sanitation is particularly desirable. For this type of installation, the inner edge of the decking panels is preferably held in sealed relation with the machinery, which may be accomplished by means of a bracket 170 and a strip of rubber 171 cooperating with the screw 172. In this case the proportions of the decking panels are such that they will not be received within the recess 160 but will merely approach the outer end of this recess as shown. This type of installation is desirable to prevent food particles working between the decking panels and the machinery, and it is also found desirable in this type of installation to provide a seal such as a rubber pad 175 (Fig. 30) between the lower end of each leg of the main frame and the floor to prevent possible accumulation of food particles around the connection between the leg and the floor.

It will accordingly be seen that the present invention provides shielding apparatus having a wide range of useful applications in conjunction with many types of industrial installations. Since the main frame of the apparatus is free standing, it is independent of the outer configuration of the equipment with which it is used and may readily be designed to fit many different types of equipment and arrangements. It may entirely surround the equipment as illustrated in Fig. 1, or it may run at one end from a wall as indicated in Fig. 4, in which case a side leg is placed at each corner adjacent the wall as shown. Another outstanding advantage of the invention is that while the apparatus effectively shields the machinery and the operating personnel in use, its panel portions are quickly and easily removable to provide access to the machinery for cleaning, servicing and like purposes. The apparatus of the invention is therefore of major practical assistance in maintaining clean operating conditions, and this in turn has been found to promote high morale among the personnel and resulting high quality workmanship as well as to reduce product spoilage and thus generally to contribute to increased efficiency for both the equipment and the personnel.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing and the lower ends of said legs for supporting said panels on said frame in outwardly spaced relation with said machine to enclose the sides of said machine, said supporting means being releasable to provide for individual removal of said panels for access to said machine, curved panel members on said legs at the corners of said frame proportioned to abut adjacent said flat panels with the outer surface thereof forming a smooth connection between said adjacent panels avoiding sharp edges and projections, and decking supported by the upper part of said frame and extending inwardly from said railing to enclose from above the space between said panels and said machine.

2. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, said legs having the outer edges thereof extending upwardly and outwardly with respect to said machine to support said railing in outwardly spaced relation with the lower ends of said legs providing increased foot room for the operator, a plurality of generally flat panels adaped to form the sides of said shielding apparatus and each proportioned to fill the space between adjacent said legs, means on said railing and the lower ends of said legs for supporting said panels on said frame in outwardly spaced and enclosing relation with the sides of said machine, said supporting means being releasable to provide for individual removal of said panels for access to said machine, and conically curved panel members on said legs at the corners of said frame proportioned to abut adjacent said flat panels with the outer surfaces thereof forming a smooth connection between said adjacent panels avoiding sharp edges and projections.

3. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing forming a recess open along the lower edge thereof for receiving the upper ends of said panels, means on said legs for releasably securing the lower ends of said panel in fixed relation with said frame, said securing means being constructed for release upon upward movement of said panels into said recess to provide for individual removal of said panels for access to said machine, and curved panel members on said legs at the corners of said frame proportioned to abut adjacent said flat panels with the outer surfaces thereof forming a smooth connection between said adacent panels avoiding sharp edges and projections.

4. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing and the lower ends of said legs for supporting said panels on said frame in outwardly spaced relation with said machine to enclose the sides of said machine, said supporting means being readily releasable to provide for individual removal of said panels for access to said machine, curved panel member on said legs at the corners of said frame proportioned to abut adjacent said flat panels with the outer surfaces thereof forming a smooth connection between said adjacent panels avoiding sharp edges and projections, decking adapted to form a top for said shielding apparatus, means on said railing forming a recess open along the inner edges thereof for receiving the outer edges of said decking to provide a substantially sealed connection between said decking and said railing, and means on said legs cooperating with said decking to support said decking in position enclosing from above the space between said panels and said machine.

5. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing and the lower ends of said legs for supporting said panels on said frame in outwardly spaced relation with said machine to enclose the sides of said machine, said supporting means being readily releasable to provide for individual removal of said panels for access to said machine, curved panel members on said legs at the corners of said frame proportioned to abut adjacent said flat panels with the outer surfaces thereof forming a smooth connection between said adjacent panels avoiding sharp edges and projections, decking adapted to form a top for said shielding apparatus and including a plurality of flat panels of sufficient thickness to be self-supporting, means on said railing forming a recess open along the inner edge thereof and of lesser vertical dimensions than the thickness of said decking panels for receiving the edges of said decking panels in wedged relation therein, said decking panels having a beveled edge providing a cam surface facilitating insertion of said decking panels in said recess, and means on said legs extending inwardly of said frame to support the underside of said decking on said frame.

6. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing forming a recess open along the lower edge thereof for receiving the upper ends of said panels, means on said legs for releasably securing the lower ends of said panel in fixed relation with said frame, said securing means being constructed for release upon upward movement of said panels into said recess to provide for individual removal of said panels for access to said machine, curved panel members on said legs at the corners of said frame proportioned to abut adjacent said flat panels with the outer surfaces thereof forming a smooth connection between said adjacent panels avoiding sharp edges and projections, decking adapted to form a top for said shielding apparatus, means on said railing forming a recess open along the inner edges thereof for receiving the outer edges of said decking to provide a substantially sealed connection between said decking and said railing, and means on said legs cooperating with said railing to support said decking in position enclosing from above the space between said panels and said machine.

7. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, a plurality of generally flat panels adapted to form sides for said shielding apparatus and each proportioned to fill the space between adjacent said legs, means on said railing and the lower ends of said legs for supporting said panels on said frame in outwardly spaced relation with said machine to enclose the sides of said machine, said supporting means being readily releasable to provide for individual removal of said panels for access to said machine, and each of said legs located at a corner of said frame including a smoothly curved outer surface portion arranged along the side edges thereof for close fitting engagement with the side edges of the adjacent said panels to form a smooth interconnection between said adjacent panels avoiding sharp edges and projections.

8. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, said legs having the outer edges thereof extending upwardly and outwardly with respect to said machine to support said railing in outwardly spaced relation with the lower ends of said legs providing increased foot room for the operator, a plurality of generally flat panels adapted to form the sides of said shielding apparatus and each proportioned to fill the space between adjacent said legs, means for supporting said panels on said outwardly extending leg portions to maintain said panels in outwardly spaced and enclosing relation with the sides of said machine, said supporting means being releasable to provide for individual removal of said panels for access to said machine, said panels having substantially parallel side edges providing diverging spacing between the side edges of adjacent said panels at each corner of said frame, there being one said leg at each said corner, each said corner leg including a smoothly curved outer surface portion having the outer edges thereof diverging from one end of said leg to the other to fill in said diverging spacing between the panels at said corner and proportioned to abut adjacent said flat panels forming a smooth interconnection between said adjacent panels avoiding sharp edges and projections.

9. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto and including a plurality of substantially right angled corners, said legs having the outer edges thereof extending upwardly and outwardly with respect to said machine to support said railing in outwardly spaced relation with the lower ends of said legs providing increased foot room for the operator, a plurality of generally flat panels adapted to form the sides of said shielding apparatus and each proportioned to fill the space between adjacent said legs, means for supporting said panels on said outwardly extending leg portions to maintain said panels in outwardly spaced and enclosing relation with the sides of said machine, said supporting means being releasable to provide for individual removal of said panels for access to said machine, said panels having substantially parallel side edges providing decreased spacing from top to bottom between the side edges of adjacent said panels at each inside said corner of said frame and providing increased spacing from top to bottom between the side adjacent of said panels at each outside said corner of said frame, there being one said leg at each said corner, each said inside corner leg including a smoothly concave outer surface portion having the outer edges thereof diverging from top to bottom and each said outside corner leg including a smoothly convex outer surface portion having the side edges thereof converging from top to bottom, said leg surface portions being proportioned to fill in said spaces between said corner panels and to abut said corner panels to form a smooth interconnection between said corner panels avoiding sharp edges and projections.

10. Apparatus of the character described for shielding a machine independently of structural connection with said machine, comprising a plurality of separate legs adapted to be secured to the floor outwardly of said machine with the lower ends thereof in spaced and unconnected relation, means including a railing secured to the upper ends of said legs and cooperating therewith to form a frame surrounding said machine in fixed outwardly spaced and unconnected relation thereto, said legs having the outer edges thereof extending upwardly and outwardly with respect to said machine to support said railing in outwardly spaced relation with the lower ends of said legs providing increased foot room for the operator, a plurality of generally flat panels adapted to form the sides of said shielding apparatus and each proportioned to fill the space between adjacent said legs, means on said railing forming a recess open along the lower edge thereof for receiving the upper ends of said panels, upward projections at the lower ends of said legs, said panels having openings in the lower ends thereof for receiving said projections for cooperation therewith to maintain said panels in fixed relation with said frame while providing for individual release and removal thereof upon upward movement of said panels into said recess, and curved panel members on said legs at the corners of said frame proportioned to abut adjacent said flat panels with the outer surfaces thereof forming a smooth interconnection between said adjacent panels avoiding sharp edges and projections.

WALLACE D. HERRICK.

References Cited in the file of this patent

UNITED STATES PATENTS

| Number | Name | Date |
|---|---|---|
| 739,581 | Bragunier | Sept. 22, 1903 |
| 1,868,485 | Hart | Feb. 23, 1932 |
| 1,878,072 | Vance | Sept. 20, 1932 |
| 2,139,618 | Hall | Dec. 6, 1938 |
| 2,167,525 | Rosendale | July 25, 1939 |
| 2,174,180 | Rand | Sept. 26, 1939 |
| 2,205,826 | Small | June 25, 1940 |
| 2,313,690 | White | Mar. 9, 1943 |
| 2,560,400 | Abrahamson | July 10, 1951 |
| 2,574,758 | Ridder | Nov. 13, 1951 |